May 8, 1928.
C. A. JOHNSON
MEAT CUTTER KNIFE
Filed June 22, 1925
1,669,088
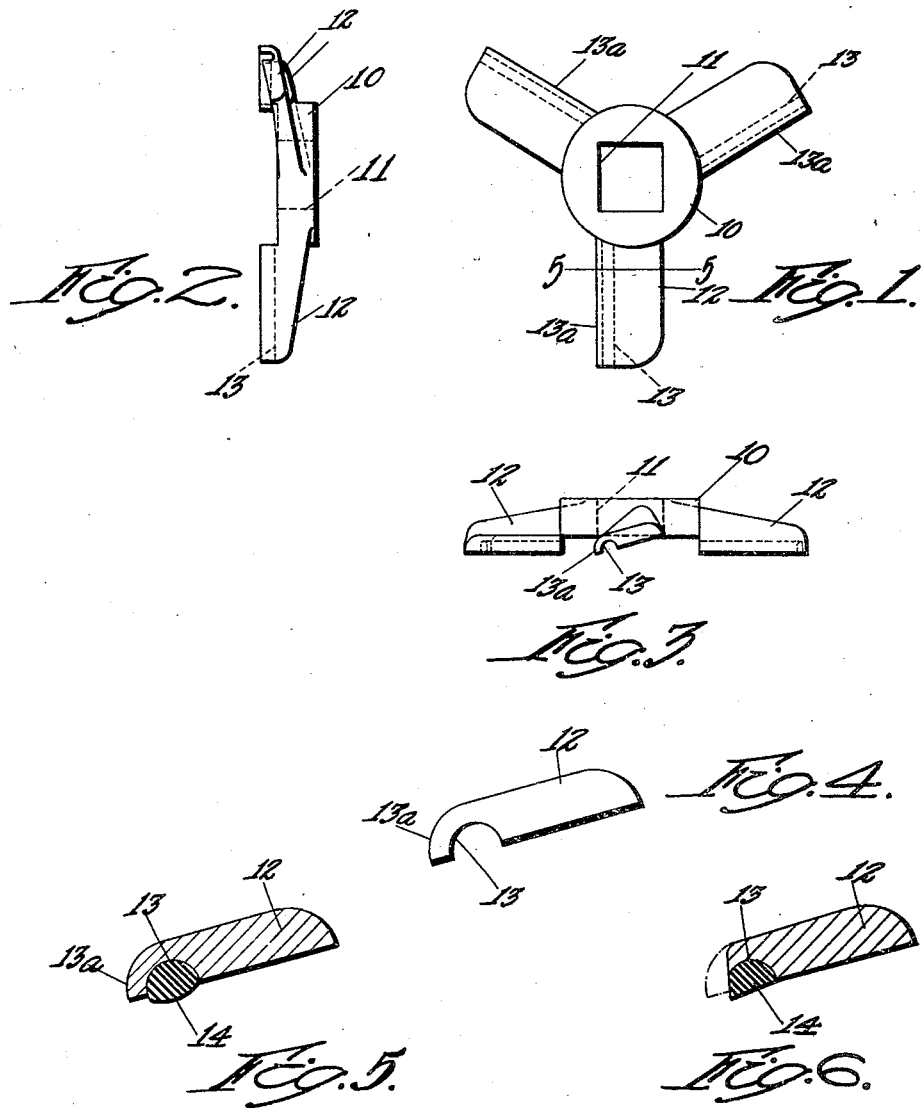
Inventor:
Carl A. Johnson
By Attorneys
Southgate Fay + Hawley Patented May 8, 1928.

1,669,088

UNITED STATES PATENT OFFICE.

CARL A. JOHNSON, OF WORCESTER, MASSACHUSETTS.

MEAT-CUTTER KNIFE.

Application filed June 22, 1925. Serial No. 38,694.

This invention relates to a meat cutter knife and to an improved method of manufacturing the same.

It is the general object of my invention to improve the construction of such knives and at the same time to decrease the cost of manufacture thereof.

In the attainment of this object, I form the knife by a new and improved method which enables me to use a reduced amount of expensive tool steel in the construction of the knife and which also reduces the labor involved in producing the knife. The knife is also stronger and more efficient than the knives previously in use.

A preferred form of my invention is shown in the drawings in which

Fig. 1 is a plan view of a forging from which my improved knife may be formed;

Fig. 2 is a side elevation thereof;

Fig. 3 is a front elevation thereof;

Fig. 4 is an enlarged end view of one of the arms of the forging; and

Figs. 5 and 6 are sectional views taken along the line 5—5 in Fig. 1 and showing successive steps in the production of my improved knife.

Referring to Figs. 1, 2 and 3, I have shown a forging comprising a body or hub 10 having a non-circular opening 11 therein and provided with a plurality of arms 12. While the number of arms may be varied, I prefer to use three arms as this provides a three-point contact with the die or plate through which the meat is forced and enables the cutter to adapt itself more readily to any slight irregularity or inaccuracy in the surface. Each arm 12 of the forging is provided with a substantially semi-circular recess 13 near the leading outer edge thereof and extending lengthwise of the arm.

In the process of manufacturing my improved knife, I take a forging as above described and fill the recess 13 with tool steel by welding the same therein, preferably by the use of acetylene gas. I also prefer to use a self hardening steel which does not require heat treatment after being welded in position.

After the recesses 13 have been filled with steel 14, as above described, the arms are ground to the finished shape shown in Fig. 6, in which it will be seen that the outer wall 13ª of the recess 13 is largely ground away, leaving the inserted tool steel 14 to form the cutting edge of the knife.

In this way I am able to construct a meat cutter knife having its cutting portions formed of the highest grade of self-hardening tool steel, while at the same time only a very small amount of this expensive steel is required. Knives thus constructed have been found very efficient and entirely satisfactory in use.

Having thus described my improved knife, and the method of manufacture thereof, I do not wish to be limited to the details herein disclosed otherwise than as set forth in the claims, but

What I claim is:

1. A meat cutter knife, comprising a hub and three radial arms substantially equally spaced about said hub and providing a three-line bearing on the cooperating member in said cutter, each arm having a recess extending the length thereof and having an insert of self-hardening tool steel welded in said recess at the leading outer corner of said arm and providing a wear-resisting cutting edge for said arm, said insert being of very small cross section relative to the sectional area of said arm, and having a portion extending back from the cutting edge transversely of said arm to form an extended wearing face at an angle to the adjacent surface of said arm.

2. A meat cutter knife, comprising, a hub and three radial arms substantially equally spaced about said hub, each arm having a recess therealong and an insert of self-hardening tool steel welded in said recess, said insert projecting beyond the plane of the surface of said arm to provide a wear resisting cutting edge for said arm, and having a portion extending back from the cutting edge transversely of said arm to form an extended wearing face at an angle to the adjacent surface of said arm, said insert being of very small cross section relative to the sectional area of said arm, the several inserts providing a three line bearing on the cooperating member in said cutter.

3. A meat cutter knife comprising a hub and three radial arms substantially equally spaced about said hub, each arm having an insert of self-hardening tool steel welded in a recess at the leading outer corner of said arm and providing a wear resisting cutting edge for said arm, said inserts being of very small cross section relative to the sectional area of said arms, said inserts each having a surface extending beyond the plane of the surface of the respective arms and in angular relation thereto, whereby to provide cutting edges and a three line bearing on the cooperating member in said cutter, and each insert having a portion extending back from the cutting edge transversely of said arm to form an extended wearing face at an angle to the adjacent surface of said arm.

4. The method of making a meat cutter knife, which consists in providing a forging having arms with recesses adjacent the cutting edges of said knife and extending lengthwise of said arms, filling said recesses with an excess of self-hardening tool steel, welding the same therein and thereafter forming a cutting edge and bearing on each arm by grinding away the outer wall of its recess, thus positioning the inserted steel at the leading outer corner of each arm beyond the plane of the surface of said arm to provide a wear resisting cutting edge and bearing, and to provide a portion extending back from the cutting edge transversely of said arm to form an extended wearing face at an angle to the adjacent surface of said arm.

In testimony whereof I have hereunto affixed my signature.

CARL A. JOHNSON.